United States Patent [19]

Hess

[11] Patent Number: 4,489,586
[45] Date of Patent: Dec. 25, 1984

[54] DEVICE FOR MEASURING THE FOLD ANGLE IN A SHEET METAL BENDING PRESS

[76] Inventor: Johann Hess, Talstrasse 26, 7057 Leutenbach, Fed. Rep. of Germany

[21] Appl. No.: 241,689

[22] Filed: Mar. 9, 1981

[30] Foreign Application Priority Data

Mar. 7, 1980 [DE] Fed. Rep. of Germany ....... 3008701

[51] Int. Cl.³ .............................................. B21D 5/02
[52] U.S. Cl. .......................................... 72/389; 72/32
[58] Field of Search ...................... 72/389, 386, 36, 32, 72/34, 35, 441, 478

[56] References Cited

U.S. PATENT DOCUMENTS

| 1,826,783 | 10/1931 | Hess | 72/413 |
| 3,146,819 | 9/1964 | Van Endert | 72/389 |
| 3,474,657 | 10/1969 | Spiegel | 72/478 |

FOREIGN PATENT DOCUMENTS

| 2044199 | 3/1972 | Fed. Rep. of Germany . |
| 2803375 | 8/1978 | Fed. Rep. of Germany . |
| 7625952 | 3/1978 | France . |
| 385145 | 3/1965 | Switzerland .......................... 72/386 |

*Primary Examiner*—Gene P. Crosby
*Attorney, Agent, or Firm*—Joseph A. Geiger

[57] ABSTRACT

A device for measuring the fold angle in a sheet metal bending press of the type in which a press head forces the workpiece into the V-shaped groove of a die block, the fold angle measuring device having one or two spring-loaded feeler rods in contact with the workpiece laterally outside the bending edge of the press head, the feeler rod, or rods, being connected to an indicator or transducer of the resistive, capacitive, or photoelectric type, for a readout and/or an electrical output signal usable in a feedback circuit of the press controls. The components of the device are arranged in the cavity of a narrow, block-shaped housing which has substantially the same outline as the adjoining sections of the press head.

14 Claims, 9 Drawing Figures

DEVICE FOR MEASURING THE FOLD ANGLE IN A SHEET METAL BENDING PRESS

BACKGROUND OF THE INVENTION

1. Field of the Invention

The present invention relates to sheet metal bending presses, and, more particularly, to a device for continuously measuring the angle of a sheet metal fold, as it is produced in a bending press between a die block and a penetrating press head.

2. Description of the Prior Art

It is common practice to use a sheet metal bending press for the production of shapes of various kinds from sheet metal. Such a press is generally equipped with a die block and a cooperating press head. The die block is preferably of quadrangular shape, so that it can be clamped onto the press table in any one of four different rotational positions. On its four flat sides, the die block may have one or more V-shaped longitudinal grooves of differing opening angle and/or differing width and depth. The head is normally composed of a number of longitudinally contiguous head sections of selected unequal lengths, all the head sections having the same elevational outline, i.e. identical cross-sectional shapes.

In practice, it is desirable for a sheet metal bending press to have several interchangeable heads of differing cross-sectional shape, the differences relating to (a) the lip angle defined between the two bending flanks on opposite sides of the bending edge, and/or (b) the radius at the bending edge, and/or (c) the adjoining shape of the head contour, up to a common attachment profile by which the head is attached to the press ram. The specific choice of the die block or of a particular bending groove and of the head shape depends primarily on the shape for the sheet metal workpiece to be bent, on the gauge of the sheet metal used, and/or on its deformation characteristics.

The actual bending process which takes place when a workpiece is shaped in such a bending press is not a forming process of the kind in which the sheet metal part is firmly clamped between a die and a punch, but it is more like a free-form bending process in which the sheet metal is simply pressed against the normally rounded edges of the V-groove in the die block, as the bending edge of the head is forcibly lowered into the V-groove to such a depth as is necessary to obtain the desired fold angle. The sheet metal thereby undergoes a bending action under the bending edge of the head, and the result is not only a permanent plastic deformation, but also a more or less extensive elastic deformation. Because of this elastic deformation, the fold flanks will exhibit a certain amount of springback, and a corresponding increase in the fold angle, as soon as the head pressure is released.

In order to attain the desired nominal fold angle, it is therefore necessary to bend the sheet metal workpiece beyond the nominal value of the fold angle by the amount which corresponds to the anticipated springback. The initial adjustment of the bending press, therefore, requires that, following the first bending operation, the sheet metal workpiece be removed and its fold angle measured. The workpiece then needs to be returned into the bending press, to be bent deeper by the required amount. This procedure is cumbersome and it may be difficult in the case of workpieces of large dimensions and/or considerable weight. Furthermore, it is subject to the risk that the workpiece is not replaced precisely into its previous position in relation to the bending tools, so that the subsequent bending operation will result in ruining of the workpiece. Of course, a workpiece which has been bent too deeply in the first bending operation is thereby already ruined. On the other hand, it is possible that even in a bending press which has been properly adjusted for a production run, inconsistant bending results may be obtained, due to changes in the plastic deformation of the sheet metal, for example, when the deformation resistance of the sheet metal changes, or when the sheet metal gauge varies, or also, when the grain orientation in the sheet metal is not the same for all workpieces. In the event of such inconsistant bending results, it will be necessary to subject the defective workpieces to a second bending operation or to reject them altogether.

By way of a remedy to the above-mentioned problems, it has already been suggested to equip such a sheet metal bending press with a device which provides a measurement of the fold angle of the workpiece, while the latter remains in place on the table of the bending press.

One such fold angle measuring device is disclosed in German Offenlegungsschrift (Publ. Appln.) No. 28 03 375. It features a special prism-shaped die block with a single V-shaped groove on its flat upper side. At a point along this groove is arranged a vertical bore of a diameter which is smaller than the width of the groove. In it is slidably arranged a cylindrical measuring plunger with a compression spring urging the plunger upwardly. The upper end portion of the plunger has a V-groove with flanks at the same angle and identically rounded as the flanks of the V-groove in the die block. The lower portion of the measuring plunger is a push rod which extends downwardly from the die block, reaching into a second prism-shaped body which is arranged below the die block, in alignment with the axis of the measuring plunger. There, the push rod of the measuring plunger cooperates with a rack-and-pinion drive, transmitting its vertical movements to the rack which rotates the pinion and a connected rotary indicator. Depending on the particular construction of this indicator, it is thus possible to read the distance of vertical displacement of the measuring plunger in relation to the die block or to directly determine the corresponding fold angle of the workpiece. The fold angle is a function of the vertical difference in the levels at which the outer bending edges of the die block and the outer edges of the measuring plunger contact the inclined flanks of the folded sheet metal workpiece.

The measuring plunger of this device has to have the same V-groove outline as the die block itself. Therefore, the use of this device is restricted to a particular die block and a change of tools implies a corresponding change of the fold angle measuring device. The fact that with each change in the thickness and/or material characteristics of the sheet metal stock a different V-groove profile is required, even when the fold angle remains unchanged, means that each of these grooves requires a different die block with a separate fold angle measuring device. This reflects itself in high investment costs for tooling and in the need for a large tooling inventory.

The described fold angle measuring device has the additional shortcoming that, because of its arrangement in the groove of the die lock, its measuring plunger and guide parts are exposed to dirt and foreign particles which are being wiped from the sheet metal panels as they are dragged over the die block. This dirt then accummulates in the groove and around the measuring plunger. Consequently, the measuring accuracy and operational reliability, and ultimately the longevity of such a measuring device depend to a great extent on the care and frequency with which the die block and the measuring plunger are cleaned. This means that, as soon as dirt or foreign particles have penetrated the gap between the measuring plunger or its push rod and the cooperating guide bores, these parts must be dismantled for cleaning. This procedure is difficult and time consuming, and if performed on the press table, represents down time for the sheet metal bending press.

Another fold angle measuring device is disclosed in German Offenlegungsschrift No. 20 44 199, which suggests the arrangement of a small sensing carriage on the upper side of the workpiece, in the vicinity of the bending edge of the press head, and which, by following the angular movement of the sheet metal during the bending operation in parallel alignment therewith, transmits this angular movement to a rotary potentiometer to which it is connected by means of a parallel linkage. This parallel linkage has two vertically oriented longitudinal links joined by two transverse links of which the lower one is the sensing carriage itself. The proximate vertical link is restrained to a vertical orientation by means of a longitudinal guide support, along which it moves vertically. The rotary potentiometer is arranged at the joint between the distal vertical link and the upper transverse link. The weight of the vertically movable portion of the device, assisted by a compression spring associated with the vertical guide support and a torsion spring opposite the potentiometer, act to produce a sensing pressure between the carriage and the workpiece. The entire device is carried by a vertical rod which is clamped to the press ram in a vertically adjustable position and a short intermediate rod with two adjustably clampable rod junctions, for a lateral adjustment of the position of the linkage and sensing carriage. The entire device is supported on the press ram and does not touch the press head.

The numerous joints, bearings and guides suggested for this prior art device require precision parts, implying that this device is expensive to manufacture and must be serviced regularly. The transversely oriented sensing carriage and the parallel linkage above it require considerable space in the lateral sense, even when arranged in a recess of the press head. The need for such a recess precludes any relocation of the device in the longitudinal sense of the sheet metal bend. The application of this device is therefore limited to simple, cross-sectionally straight heads, and the applicability of such a bending press is limited to simple bends on sheet metal workpieces which make allowance for the extra space requirements of this fold angle measuring device, thus precluding workpieces which require tight bends. The lateral extent of the sensing carriage also requires a comparatively large minimum distance of the fold center line from the nearest edge of the workpiece. The need for accurate parallelism of the linkage requires double joints on its four pivot points and, with the rotary potentiometer mounted on the outside of one of them, the device also occupies considerable space in the longitudinal sense of the press head. Lastly, the fact that the entire device is arranged on the outside of the press head means that there exists the risk that a sheet metal workpiece, especially one with a previously upended edge portion, may inadvertantly be pushed against the sensing carriage or the parallel linkage of the measuring device, thereby bending or otherwise damaging the latter. At the least, the device will have to be readjusted in its position.

A third prior art device for the measurement of fold angles is disclosed in the French Demande de Brevet (Publ. Appln.) No. 76 25 952. The device suggested in this publication features two parallel sensing rods arranged in the press head, at unequal lateral distances from its bending edge. The two sensing rods are oriented at a slight incline from the vertical axis of the press head cross section, extending upwardly through the latter into a gap between spacer plates attaching the press head to the press ram. In this gap, the distal sensing rod carries fixedly attached to it a vertical plate with a bellcrank whose pivot axis intersects the sensing rod axis. The proximate sensing rod engages the spring-loaded bellcrank from below, so that the two sensing rods together transmit any angular change in the sheet metal orientation to the bellcrank in the form of an identical angular change of the latter. To the axis of the bellcrank is attached a rotary potentiometer which produces an angle-related signal.

This device requires the use of special spacer plates between the press head and the press ram for the arrangement of a gap of sufficient width to accommodate the vertical plate and the potentiometer. The sensing rods and their springs are arranged in the press head itself, being not readily removable from the latter. This creates a handling difficulty for the press head, since portions of the device protrude over the press head cross section on several sides, thereby exposing the device to the risk of damage, when the press head is not attached to the press ram.

SUMMARY OF THE INVENTION

It is a primary objective of the present invention to suggest a better solution to the problem of continuously measuring the fold angle in connection with the bending of sheet metal parts in a bending press. The improved device is to be of simple, compact construction, produceable at reasonable manufacturing cost, and it is to be reliable and accurate in its performance, without being prone to damage and breakdowns during use.

The present invention proposes to attain this objective by suggesting a fold angle measuring device which is adapted for arrangement between separate press head sections of a sheet metal bending press, the device being self-contained and having preferably the same cross-sectional outline as a regular head section, including a bending edge which is aligned with the bending edge of the press head, with flat end faces abutting against the end faces of the adjoining head sections. Outwardly, the device forms a closed block-shaped housing whose cross-sectional outline forms a continuation of the cross-sectional profile of the press head, with the possible exception, where necessary, of a protruding part or portion at a location which is sufficiently remote from the bending edge for the accommodation of a suitable measuring instrument or transducer.

This adaptation of the housing of the measuring device to the cross section of the press head sections makes it possible to arrange the measuring device at any longitudinal location of the press head, without in the least encumbering the working space around the latter. A long press head may carry two or more of these measuring devices at different locations.

The incorporation of the novel fold angle measuring device in the sectional press head means that the device remains above the workpiece and out of contact with the press table. The advantage of such an arrangement is that the movable part of the measuring device is not exposed to the dirt and particulate matter which is frequently transferred to the press table and the die block from the workpieces. An additional advantage of the invention lies in the arrangement of the sensing member in the form of a vertically movable feeler rod which, by riding on the upper side of the workpiece, as the latter is being bent against the bending edge of the press head, transmits the relative displacements between the head and the upwardly pivoting portion of the workpiece to a suitable displacement indicator, or to a transducer, for visual verification and/or for the production of control signals which automatically govern the drive controls of the bending press.

The housing of the device is preferably a block resembling a "slice" of the press head profile, with a housing cover in the form of a thinner "slice" of the head profile. The housing cavity is milled into an end face of the housing block. The feeler rod and its guide channel in the housing cavity are preferably rectangular in cross section, thus preventing the feeler rod from rotating. This makes it possible to have a line contact, rather than a point contact, between the upper surface of the workpiece and the lower extremity of the feeler rod, preferably at a distal side of the latter. It follows that the proximate guide face for the feeler rod in the housing cavity can be arranged in the immediate vicinity of the bending edge, thereby minimizing any cantilever action on the feeler rod from the friction which occurs between the contact edge of the feeler rod and the workpiece, as the former moves upwardly and the latter moves along an arcuate path.

The fact that the fold angle measuring device of the invention is a self-contained assembly, attachable to the press ram much like a regular, very short press head section, makes it possible to preset the rest position of the feeler rod, before the device is attached to the press ram, so that the device can be installed or repositioned longitudinally between any two head sections with a minimum of press down time. In the case of workpieces which require folds of considerable length, it is advantageous to use several fold angle measuring devices which are spaced over the length of the press head.

The direction of movement of the feeler rod is preferably vertical, i.e. parallel to the penetration movement of the press head, so that the relationship between the displacements on the feeler rod and the fold angle on the workpiece can be expressed with a simple trigonometric function: The feeler rod displacement represents the tangent of the angle by which each side of the sheet metal fold is raised in relation to a plane of symmetry, or the cotangent of one-half of the enclosed fold angle.

The present invention also offers the possibility of arranging two separate sensing devices on opposite sides of the bending edge of the press head, inside a common housing, for the independent verification of the fold angle from both sides of the center plane. Such a measurement will immediately show up any misalignment between the center plane of the V-shaped groove and the bending edge of the press head, so that prompt corrective adjustments can be made, if necessary.

By way of a preferred embodiment of the present invention, it is further suggested that the fold angle measuring device have two feeler rods arranged on the same side of the bending edge, in a plane which is perpendicular to the bending edge, so that the fold angle can be determined from the difference of displacement between the two feeler rods, without taking into account the size of the bending radius under the bending edge.

The actual translation of the displacement of the feeler rod, or feeler rods, into the desired control output signal can be accomplished in one of several ways, using, for example, a precision indicator to obtain a visual reading. Such an arrangement may require that the indicator be on the outside of the housing, while its shaft reaches into the housing cavity, through an appropriate bore, so that the indicator pin is in direct push-contact with the feeler rod. And, because such an arrangement necessitates an inclined orientation of the indicator shaft, it is suggested that the push face of the feeler rod be similarly inclined. Alternatively, it is possible to use intermediate transmission means between the feeler rod and the indicator, especially in the case of a tall press head, a preferred transmission means being hydraulic pressure. The latter also allows for a ready magnification of the displacement values.

In the case of a bending press with automatic controls, it is, of course, preferable to employ appropriate motion transducers in conjunction with a feedback circuit, in order to accomplish an automatic operation of the press. It will then only be necessary to preset the desired fold angle which will be established automatically by the press controls, in response to an electronic output signal from the fold angle measuring device. Suitable motion transducers for this purpose may be of the type which use the feeler rod displacement to obtain a variation of ohmic resistance, a variation of inductive resistance, or a variation of capacitance. Still another advantageous approach involves the use of a photoelectric transducer which responds to the displacement of grids, in order to produce a corresponding change in light intensity which is converted into an electronic signal output by suitable photoreceptors. This type of motion transducer is highly accurate and requires little space.

In the case of two feeler rods, it may be preferable to have the two components of the measuring pair, viz. the coil and the wiper, the coil and the core, or the scale and the shadow grid, so arranged that each feeler rod carries one of the two components of the pair, thereby producing an output signal which reflects only the difference in feeler rod displacements. This approach eliminates the necessity of adjusting a precise, vertical rest position for the feeler rods in relation to the bending edge of the press head.

BRIEF DESCRIPTION OF THE DRAWINGS

Further special features and advantages of the invention will become apparent from the description following below, when taken together with the accompanying drawings which illustrate, by way of example, several embodiments of the invention which are represented in the various figures as follows.

DESCRIPTION OF THE PREFERRED EMBODIMENTS

Figures 1, 4:
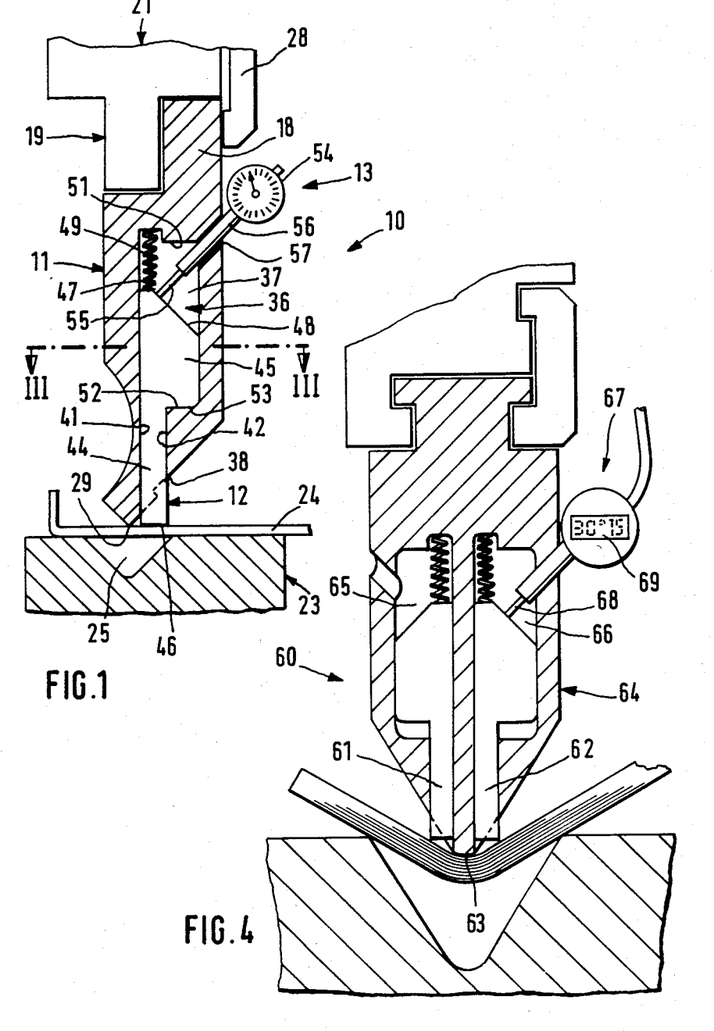
FIG. 1 represents the work station of a bending press, showing a first embodiment of the invention, as seen in an elevational cross section.
FIG. 4 is an elevational cross section similar to that of FIG. 1, showing a second embodiment of the invention.

A first embodiment of the invention is shown in FIG. 1, where it can be seen that the fold angle measuring device 10 consists of three main components, a housing 11, a feeler rod 12, and an indicator 13.

Figure 2:
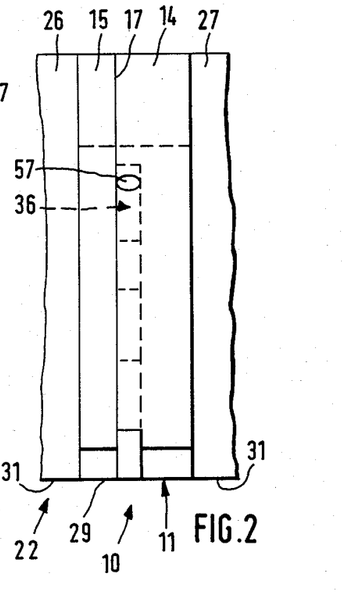
FIG. 2 is a side view of the head assembly of FIG. 1, showing the device of the invention mounted between two head sections.
Figure 3:
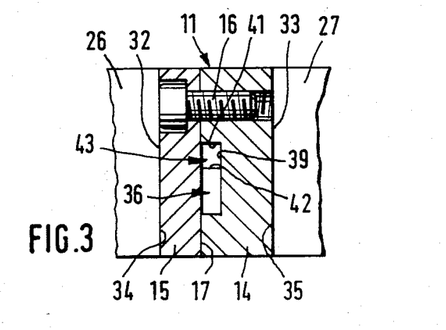
FIG. 3 is a plan view of the head assembly of FIG. 2, showing a cross section of the device, as taken along line III—III in FIG. 1.

As can be seen in FIGS. 2 and 3, the housing 11 consists of two parts, a housing block 14 and a matching housing cover 15. The two housing parts are clamped together by means of screws 16. Seen from the flat outer end faces of the housing, both the housing block 14 and its cover 15 have the same outline (FIG. 1), so that, when clamped together at their separation plane 17, they form a closed block-shaped housing 11.

The upper extremity of the housing 11 is shaped to serve as a mounting profile 18 which is adapted to match the head attachment 19 on the press ram 21 of a sheet metal bending press (which is known and therefore is not further illustrated and described herein). The head attachment ledge 19 is designed to receive and clamp a press head 22 which, in cooperation with a die block 23, forms a sheet metal bending tool. When an initially flat sheet metal workpiece 24 is placed on top of the die block 23 and the press head 22 is moved against the latter, the workpiece 24 is forcibly bent into a V-shaped die groove 25 which is arranged in the upper side of the die block 23 (cf.FIG.4). The press head 22 is normally of considerable length, so that it is advantageous to utilize a number of separate press head sections of graduated length. Two head sections 26 and 27 are shown in FIGS. 2 and 3 to adjoin the housing 11 of the measuring device 10. The same clamping plate 28 which secures the head sections 26 and 27 to the head attachment ledge 19 of the press head 22 also clamps the housing 11 in the same manner.

On its lower side, the housing 11 has a continuous bending edge 29, in alignment with the bending edge 31 of the head 22. The end faces 32 and 33 of the housing 11 are parallel and perpendicular to the bending edge 29, so that they fit between the end faces 34 and 35 of the head sections 26 and 27, respectively. The lateral contour of the housing 11, starting from the bending edge 29, is likewise in alignment with the bending flanks of the press head 22, and the adjoining portions of the housing outline are arranged not to protrude from the outline of the head 22, being preferably likewise aligned with the outline of head 22, so that the housing 11 has the same overall outline as the head 22 and can be mounted like a very short length section of the latter. This makes it possible to arrange the fold angle measuring device 10 at any desired longitudinal location of the press head 22, by rearranging the graduated head sections accordingly. In operation, the device 10 forms an integral part of the press head 22.

The housing 11 of the device is preferably machined from the same material as the press head itself. This makes it possible to give the bending edge 29 of the housing 11 the same heat treatment as is provided for the bending edge 31 of the press head 22. The housing cavity 36 is obtained by machining it out of the housing block 14 in an end-milling operation. The cavity 36 consists of a comparatively large upper cavity portion 37 which continues in a straight elongated lower cavity portion 38 having an opening at the lower outer side of the housing 11 in the vicinity of the bending edge 29.

As can best be seen in FIG. 3, the entire cavity 36 is confined to the housing block 14, being open towards the separation plane 17, where the housing cover 15 forms one of the cavity walls. The chamber-like cavity portion 37 has a rectangular outline, whereas the channel-like cavity portion 38 resembles more an elongated prism, preferably rectangular or square in cross section. The back wall 39 of the upper cavity portion 38 and the two side walls 41 and 42, together with the oppositely located surface portion of the housing cover 15, form the guide flanks of a straight-line guide channel 43 for the feeler rod 12. This rectangular guide channel 43 is downwardly oriented and at least approximately parallel to the movement direction of the press head 12. In order to improve the ease and accuracy of guidance of the feeler rod 12, it may be desirable to subject the guide flanks of the guide channel 43 to a precision-machining operation, such as a grinding operation.

The feeler rod also has an enlarged upper rod portion or head portion 45 and an adjoining lower, narrower guide portion 44. The latter is prism-shaped, with a rectangular or square cross section matching the cross section of the guide channel 43. In the downwardly extended position of the feeler rod 12, the length of its guide portion 44 is such that its lower extremity protrudes from the lower cavity portion 38, so as to extend to at least the horizontal plane of the bending edge 29 which, in the tool position shown in FIG. 1, coincides with the upper surface of the sheet metal workpiece 24. By giving a prismatic shape to the guide channel 43 of the housing 11 and to the cooperating guide portion 44 of the feeler rod 12, it is not only possible to obtain accurate low-friction guidance, but also an anti-rotation guidance of the feeler rod 12. And, by having the lateral guide flanks 41 and 42 of the guide channel 43 aligned parallel with the bending edge 29, it is possible to use the full length of the lower distal edge of the feeler rod 12 as a contact edge with the workpiece 24, when the latter tilts from its horizontal orientation to its inclined orientation during the bending operation.

The upper extremity of the head portion 45 of the feeler rod 12 has a short horizontal top face 47 in longitudinal alignment with the guide portion 44 and an adjoining, inclined larger top face 48. Against the horizontal top face 47 presses the lower end of a return spring 49 in the form of a compression spring. The upper end of the spring 49 is engaged against the top wall 51 of the housing cavity 36. A slightly recessed portion of the top wall 51 in the area of the return spring 49, as shown in FIG. 1, improves the positioning of spring 49. Similarly, the top face 47 on the head portion 45 of the feeler rod 12 may have a guide prong or a similar extension (not shown) around which the return spring 49 is engaged for better positioning. The extended rest position of the feeler rod 12, maintained by the action of the return spring 49, is determined by an abutment configuration between the upwardly facing abutment wall 52 of the housing cavity 36 and by an opposing abutment face 53 at the lower end of the head portion 45 of the feeler rod 12.

The indicator 13 may be a simple mechanical dial indicator 54 with a telescoping indicator pin 55. The shaft 56 of the dial indicator 54 supports the latter by engaging an inclined mounting bore 57 in the side of the housing 11 which extends through the thickness of the latter into the housing cavity 36. Suitable known shaft clamping means are used to firmly secure the dial indicator 54 in the mounting bore 57. Such means may include, for example, a longitudinally slotted sleeve with a slightly tapered male thread engaging a cylindrical female thread of the mounting bore 57. The position of the mounting bore 57 in the housing 11 and the orientation of its axis relative to the position of the inclined top face 48 of the head portion 45 of the feeler rod 12, and the orientation of the face 48 in relation to the movement path of the feeler rod 12 are so coordinated that the indicator pin 55 is in contact with the inclined face 48 in all displacement positions of the feeler rod 12 and that this contact is preferably always a perpendicular one.

When using a conventional dial indicator with a millimeter dial, for example, the conversion of its mm-readings into angular values is best done with the aid of a conversion table or conversion graph, taking into account the inclination of the axis of the dial indicator 54 in relation to the movement direction of the feeler rod 12, as is the case in the embodiment of FIG. 1, and also the inclination of the movement direction of the feeler rod 12 in relation to the movement direction of the press head 22, if such is the case, using the tangent function of the angle by which the one leg portion of the workpiece 24 is raised, or the cotangent function of the half-angle of the fold. Alternatively, it is also possible to equip the dial indicator with a special, non-linear dial with degree readings which have been computed by taking into account the above-mentioned determinants.

Several modified embodiments of the fold angle measuring device of the invention are illustrated in FIGS. 4 through 8. To the extent that certain components or functions and characteristics of these embodiments are not specifically described below, it is to be assumed that these are unchanged from the first-described embodiment, in order to avoid unnecessary repetitions.

FIG. 4 shows an embodiment of the invention in the form of a fold angle measuring device 60 which is adapted for use in a bending press with a press head which is large enough on both sides of its vertical plane through the bending edge that two feeler rods 61 and 62 can be arranged on opposite sides of the bending edge 63 of the housing 64. The feeler rods 61 and 62 are again guided in guide channels 65 and 66 of the housing 64, as has been explained in connection with FIG. 1. The overall arrangement is preferably symmetrical with respect to the vertical plane through the bending edge 64 and the feeler rods 60 and 61 are parallel thereto. However, the two feeler rods 61 and 62 operate independently from each other, being arranged in separate housing cavities 65 and 66. Only one of the two indicators 67 is shown in place. It resembles the dial indicator 54 of FIG. 1 to the extent that it has a similar shaft and a telescoping indicator pin 68, but it differs therefrom by having a digital readout 69.

Figure 5:
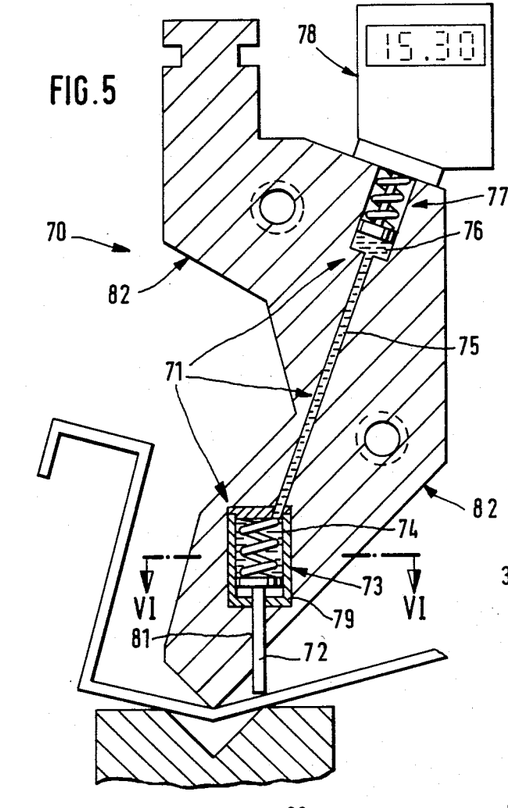
FIG. 5 is likewise an elevational cross section similar to that of FIG. 1, showing a third embodiment of the invention.
Figure 6:
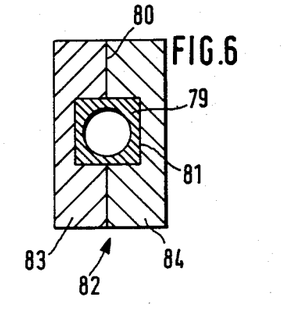
FIG. 6 is a cross section through the device of FIG. 5, as taken along line VI—VI thereof.

Another fold angle measuring device 70 can be seen in FIGS. 5 and 6. It differs from the previously described embodiments inasmuch as it utilizes a hydraulic displacement transmission 71 between the feeler rod and the indicator. This type of embodiment is particularly suited for use in conjunction with a press head which is comparatively tall and/or has a cross-sectional outline with a deep recess on one side, so that only little space is available in the area of the bending edge for the accommodation of a feeler rod and cooperating indicator of the type which has been described above.

In this embodiment, the feeler rod 52 is also the piston rod of a single-acting spring-loaded hydraulic cylinder 73 whose pressure space 74 is connected to the pressure space 76 of a similar hydraulic cylinder 77 by means of a hydraulic connecting line 75. The piston rod of the second hydraulic cylinder 77 controls an indicator 78. For a simplified manufacture and assembly of the hydraulic system, and in order to improve the leak-tightness of the displacement transmission 71, the components of the first hydraulic cylinder 73 are arranged within a self-contained small housing 79, forming a separate subassembly. This subassembly is inserted in the cavity 81 of the housing 82, so that the feeler rod 72 protrudes downwardly in the vicinity of the bending edge, as is the case in the previously described embodiments.

The guide channel portion of the housing cavity 81, as well as the housing 79 of the hydraulic cylinder 73, are again of rectangular or square outline, in order to simplify the end-milling operation of the housing cavity from its end face. As in the previously described embodiments, the housing 82 of the fold angle measuring device 70 is a two-piece housing, consisting of two similar housing halves 83 and 84. The housing cavity 81 is milled to approximately one-half into both housing halves 83 and 84. It follows that the subassembly of the hydraulic cylinder 73 is arranged approximately symmetrically with respect to the separation plane 80 of the housing 82. This makes it possible to use for the hydraulic connecting line 75 a separate element, such as a thin metal tube which is simply placed into an appropriately sized recess in the two housing halves 83 and 84. It may be preferable to deviate from the symmetrical alignment with the separation plane 80 to such an extent that the entire recess for the hydraulic connecting line 75 is contained in only one of the two housing halves 83 or 84 and that the other housing half serves as the cover in this area. The use of a thin metal tube for the hydraulic connecting line 75 has the advantage that the latter may have a curved outline, thereby making it possible to accommodate a deeply recessed or bulging cross-sectional outline of the housing 82 of the device 70. It has the additional advantage of making it possible to preassemble the hydraulic cylinder 73 and the hydraulic cylinder 77, provided the latter is of similar configuration, with the hydraulic connecting line 75 outside the housing 82 and to insert the entire preassembled displacement transmission 71 into the housing 82. It follows that the way in which the hydraulic cylinder 77 is shown in the drawing is only a schematic way. The use of a bore in the housing 82 as a cylinder bore, as shown, is only shown by way of indicating an alternative configuration. The latter implies that the piston of the cylinder 77 is guided directly in the housing bore and the associated piston rod is either coupled with or constituted by the telescoping pin of the digital indicator 78.

The hydraulic cylinders 73 and 76 of FIG. 5 are shown to have conventional sliding pistons. It should be understood that, in their place, it is also possible to utilize metallic bellows-type pistons which are free of any sliding contact with the cylinder walls. When using the hydraulic displacement transmission 71 of FIG. 5, it is also readily possible to utilize two hydraulic cylinders of unequal effective piston area, so as to obtain a magnification or a reduction of the displacements of the feeler rod.

Figure 7:
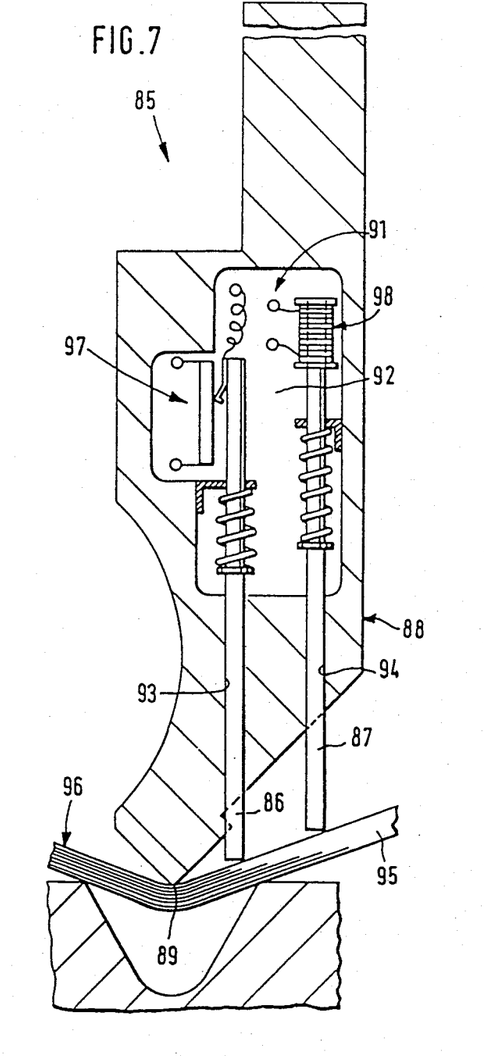
FIG. 7 is an elevational cross section of a fourth embodiment of the invention.

In FIG. 7 is shown a fold angle measuring device 85 which features two feeler rods 86 and 87 which are arranged on the same side of the bending edge 89 of the housing 88, preferably in a common perpendicular plane to the bending edge 89. The two feeler rods 86 and 87 are guided for vertical movements, in parallel alignment with each other and with the movement direction of the press head of the sheet metal bending press.

The feeler rods 86 and 87 are received in a cavity 91 of the housing 88, the cavity 91 consisting of an enlarged chamberlike upper cavity portion 92 which is common for both feeler rods, and two elongated guide channels 93 and 94 for the guidance of the feeler rods 86 and 87, respectively. As in the previously described embodiments, the guide channels 93 and 94 preferably have a rectangular or square cross-sectional outline.

Figure 9:
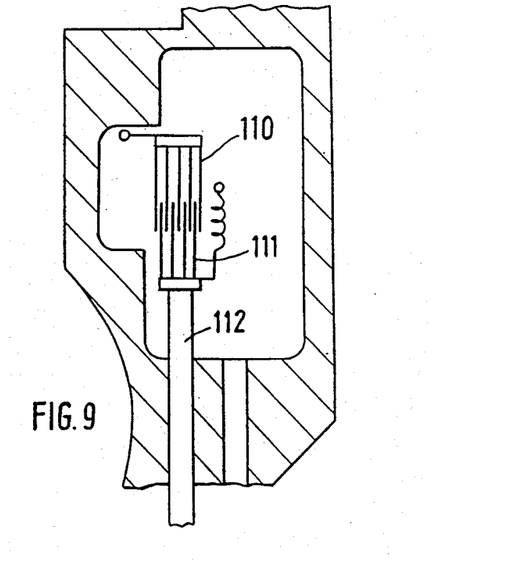
FIG. 9 shows a further modification of the embodiment of FIG. 7.

Because both feeler rods 86 and 87 are arranged on the same side of the bending edge 89, at different distances from the latter, their relative displacements reflect the actual bending angle of the underlying leg portion 95 of the sheet metal workpiece 96, without being influenced by the size of the sheet metal bending radius under the bending edge 89. The two feeler rods 86 and 87 are connected to transducers 97 and 98 which are arranged inside the housing cavity 91 and which produce electronic output signals reflecting the vertical displacements of the feeler rods 86 and 87. Electrical connections lead to remotely located readout instruments (not shown) and/or to a feedback-type control loop (likewise not shown) which automatically adjusts and/or stops the hydraulic drive of the bending press. The transducer 97 is of the potentiometer-type, having a stationary resistance element and a movable wiper which is attached to the feeler rod 86. The transducer 98 suggests an inductive resistance in the form of a coil cooperating with a moving iron core which is attached to the upper end of the feeler rod 87. It should be understood that, in actual practice, both transducers would preferably be of the same type, different transducer types being shown for descriptive purposes only. Lastly, it is also possible to use a transducer of the capacitative type, as shown in FIG. 9. The degree of overlap between the two electrodes 110 and 111 is varied through the displacement of the electrode 111 which is attached to the feeler rod 112.

Figure 8:
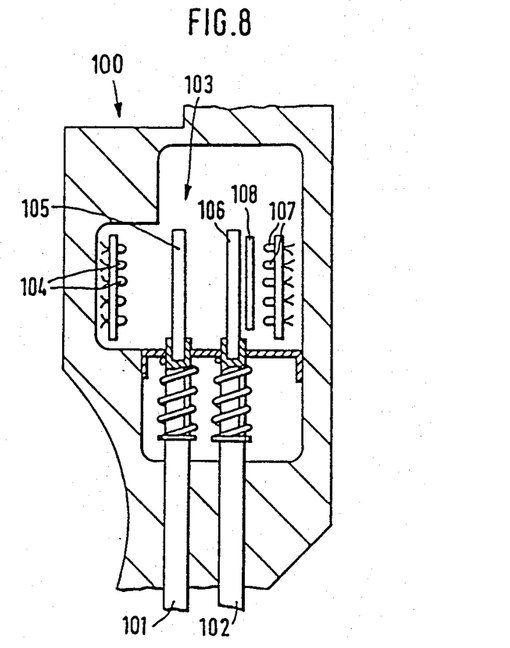
FIG. 8 shows a modification of the embodiment of FIG. 7.

FIG. 8 shows a modification of the embodiment of FIG. 7, featuring likewise a fold angle measuring device 100 with two feeler rods 101 and 102 arranged on the same side of the bending edge, but employing a photoelectric transducer 103. This transducer has a light source in the form of a vertical row of light-emitting diodes 104, glass scales 105 and 106 attached to the upper extremities of the feeler rods 101 and 102, respectively, a stationary gradation plate 108, and light receptors in the form of a vertical row of phototransistors 107 arranged on the opposite side of the light source 104. The stationary parts, including the gradation plate, or plates 108 are fixedly connected to one another, or preferably attached to a common support bracket which is not shown in the drawing. The two glass scales 105 and 106 are offset in relation to the plane defined by the two feeler rods 101 and 102, so that the two glass scales 105 and 106, while being parallel to one another, are located on opposite sides of said plane. The gradation plate 108 is preferably a single part which is wide enough to cooperate with both glass scales. The entire photoelectric transducer 103, short of the glass scales 105 and 106 which are attached to the upper extremities of the feeler rods 101 and 102, is preferably preassembled outside the fold angle measuring device, so that it can be inserted into the housing cavity as a self-contained subassembly.

It should be understood that, while the above description in connection with the embodiments of FIG. 7 and FIG. 8 suggests separate transducers associated with the two feeler rods, in order to obtain the values of relative displacement between each feeler rod and the housing of the device, it is also possible, and preferable under certain circumstances, to establish the relative displacement values between the two feeler rods only, by divorcing the transducer from the housing of the fold angle measuring device. This is done by having one feeler rod carry one of the two cooperating transducer elements, while the other feeler rod carries the other transducer element. Or, in other words, the normally stationary part, or parts, of the transducer are carried by one of the two feeler rods. For instance, in the case of the photoelectric transducer, one feeler rod would carry the glass scale, while the other one would carry, on a suitable support frame, the light-emitting diodes, the gradation plate and the photoreceptors. Such an arrangement has the advantage of directly utilizing the differential displacements between the two feeler rods, thereby rendering the measurement output independent of the rest positions of the feeler rods in relation to the bending edge.

In the case of the photoelectric transducer 103, the value of the electrical output signal is determined by the amount of light from the light source 104 which is being screened out by the glass scale 105 or 106, respectively, and by the gradation pattern of the gradation plate 108, so that, depending on the position of the movable glass scale in relation to the stationary gradation plate, progressively more or less light reaches the phototransistors which then produce an electrical output potential of corresponding level. This output signal can then be fed to a digital counter and/or to a feedback circuit in the controls of the bending press. Photoelectric transducers, in addition to being highly accurate, have the advantage of being entirely free of wear and not affected by even vast changes in temperature.

It should be understood, of course, that the foregoing disclosure describes only preferred embodiments of the invention and that it is intended to cover all changes and modifications of these examples of the invention which fall within the scope of the appended claims.

I claim the following:

1. In a sheet metal bending press of the type in which a press head forces the sheet metal workpiece downwardly into a V-shaped groove of a die block and the distance of penetration into said groove is adjustable, in order to achieve a correspondingly wider or narrower fold angle, and where the press head has an elongated beam-like shape with a straight, continuous horizontal bending edge at the lower extremity of its cross-sectional outline and a mounting profile at its upper extremity adapted for the releasable attachment of its press head to the press ram, in such a bending press, a fold angle measuring device comprising in combination:

a narrow vertically elongated housing having a bending edge at its lower extremity and a mounting profile at its upper extremity, so as to be attachable to the press ram in the same manner as the press head, in a longitudinally contiguous relationship with the latter, whereby the bending of the housing forms a continuation of the bending edge of the press head and the outline of the housing matches the cross-sectional outline of the press head, at least in those portions of the head outline which could come into contact with a workpiece;

a feeler rod guided inside the housing for up-and-down movements, said feeler rod extending downwardly from a guide channel of the housing into contact with the workpiece surface, at a distance form the bending edge, so that, when the workpiece is bent between the die block and the descending press head, said feeler rod is pushed upwardly into the housing;

means for biasing said feeler rod downwardly into contact with the workpiece surface; and means operatively connected to said feeler rod for interpreting the position of said feeler rod as a function of the fold angle impressed upon the workpiece.

2. A fold angle measuring device as defined in claim 1, wherein said means for interpreting the feeler rod position includes a displacement indicator of the telescoping type with an indicator pin which is longitudinally movable inside an indicator shaft, the latter engaging a bore which extends from outside the housing, where the readout of the indicator is visually readable, to the inside of the housing, so that the extremity of the indicator pin is positionable to ride on the upper extremity of the feeler rod.

3. A fold angle measuring device as defined in claim 1, wherein said means for interpreting the feeler rod position includes a displacement transducer of the type which produces an electronic output signal which is indicative of the position of said feeler rod.

4. A fold angle measuring device as defined in claim 3, wherein said displacement transducer is a potentiometer, using a variable ohmic resistance and a relatively movable wiper as cooperating elements, one of said cooperating elements being connected to said feeler rod.

5. A fold angle measuring device as defined in claim 3, wherein said displacement transducer is of the type using a variable inductive resistance and a relatively movable core as cooperating elements, one of said cooperating elements being connected to said feeler rod.

6. A fold angle measuring device as defined in claim 3, wherein said displacement transducer is of the type using a variable capacitance defined by two electrodes of which at least one is relatively movable, one of said electrodes being connected to said feeler rod.

7. A fold angle measuring device as defined in claim 3, wherein said displacement transducer is of the photoelectric type, using a light source opposed by photoreceptors and a relatively movable selectively light-shading member therebetween as cooperating elements, one of said cooperating elements being connected to said feeler rod.

8. A fold angle measuring device as defined in claim 1, wherein said feeler rod and said guide channel of the housing define anti-rotation guidance means for said feeler rod; and said feeler rod has a contact edge at its lower extremity in parallel alignment with the bending edge of the housing, riding on the workpiece surface with said contact edge.

9. A fold angle measuring device as defined in claim 8, wherein said anti-rotation guidance means for said feeler rod is defined by said feeler rod and said guide channel in the housing which have matching rectangular cross-sectional shapes.

10. A fold angle measuring device as defined in any one of claims 1, 2 and 3 through 9, further comprising a second feeler rod similar to said first-mentioned feeler rod and arranged symmetrically thereto with respect to the plane in which the bending edge moves, including similar means for biasing said second feeler rod and similar means for interpreting the position of said second feeler rod independently of the position of said first feeler rod.

11. A fold angle measuring device as defined in any one of claims 1 and 3 through 9, further comprising a second feeler rod arranged parallel to said first-mentioned feeler rod, on the same side of the plane in which the bending edge moves, but a different lateral distance from the bending edge than said first feeler rod;

means for biasing said second feeler rod downwardly into contact with the workpiece surface; and means operatively connected to said second feeler rod for interpreting the position of said second feeler rod as function of the fold angle impressed upon the workpiece.

12. A fold angle measuring device as defined in claim 11, wherein said means for interpreting the position of said first feeler rod and said means for interpreting the position of said second feeler rod are separate means, operating independently to interpret the position of the associated feeler rod in relation to the housing.

13. A fold angle measuring device as defined in claim 11, wherein said means for interpreting the position of said first feeler rod and said means for interpreting the position of said second feeler rod are combined in a joint means for interpreting the position of one feeler rod in relation to the position of the other feeler rod, independently of the position of either feeler rod in relation to the housing.

14. A fold angle measuring device as defined in claim 13, wherein said joint position interpreting means has one of its cooperating relatively movable elements connected to said first feeler rod and the other of said elements connected to said second feeler rod.

* * * * *